United States Patent [19]

Mailfert et al.

[11] 4,058,747

[45] Nov. 15, 1977

[54] ROTARY ELECTRICAL MACHINES HAVING A SUPERCONDUCTING FIELD WINDING

[75] Inventors: Alain Mailfert, Morsang-sur-Orge; Lionel Boyer, Alfortville, both of France

[73] Assignee: Agence Nationale de Valorisation de la Recherche (ANVAR), Neuilly-sur-Seine, France

[21] Appl. No.: 676,405

[22] Filed: Apr. 13, 1976

[30] Foreign Application Priority Data

Apr. 17, 1975  France ............................... 75.11953

[51] Int. Cl.² .......................................... H02K 9/00
[52] U.S. Cl. ..................................... 310/52; 318/646; 318/650
[58] Field of Search ..................... 310/10, 40, 50, 64, 310/54, 268, 219; 336/DIG. 1; 318/646, 650

[56] References Cited

U.S. PATENT DOCUMENTS

| | | | |
|---|---|---|---|
| 3,405,290 | 10/1968 | Halas | 310/10 |
| 3,467,841 | 9/1969 | Mignot | 310/10 |
| 3,584,246 | 6/1971 | Halas | 310/10 |
| 3,609,418 | 9/1971 | Halas | 310/10 |
| 3,639,793 | 2/1972 | Appleton | 310/10 |
| 3,670,187 | 6/1972 | Thum | 310/10 |
| 3,869,626 | 3/1975 | Puttock | 310/268 |

FOREIGN PATENT DOCUMENTS 1,289,092  9/1972  United Kingdom ................... 310/52

*Primary Examiner*—R. Skudy
*Attorney, Agent, or Firm*—Larson, Taylor and Hinds

[57] ABSTRACT

A synchronous rotary electric machine has a stationary superconducting D.C. field winding, a rotatable mechanical torque transmission shaft which carries normally conducting polyphase windings for providing a rotating field when A.C. currents circulate therein, and stationary auxiliary D.C. windings constructed to deliver a magnetic field. The currents in the auxiliary windings are adjusted for maintaining the torque and axial force tending to move the field winding under a predetermined value.

9 Claims, 2 Drawing Figures

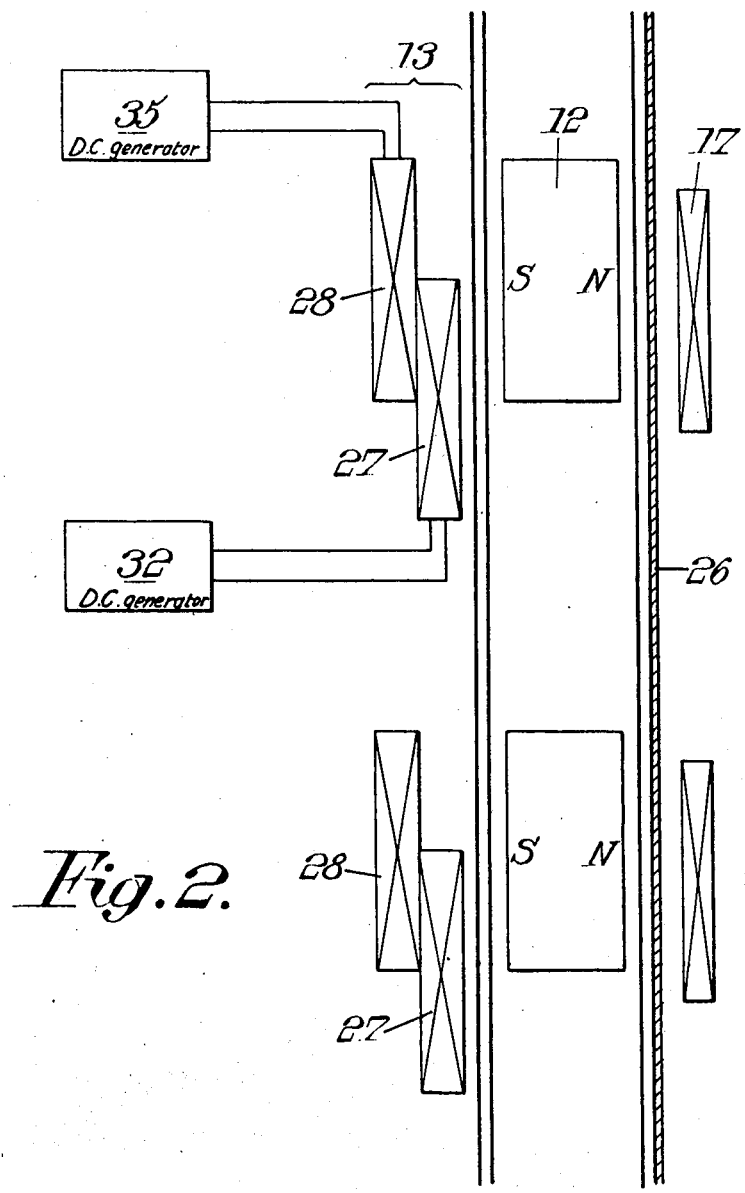

ROTARY ELECTRICAL MACHINES HAVING A SUPERCONDUCTING FIELD WINDING

BACKGROUND OF THE INVENTION

The invention relates to rotary electrical machines having a superconducting field winding.

Electrical machines adapted to operate as A.C. motors or generators have been described which comprise a superconducting field winding constructed to be supplied with direct current for producing a magnetic field having $n$ pairs of poles ($n$ being an integer), an armature having polyphase windings of normal electrical conductivity which deliver a field having $n$ pairs of poles which rotate with respect to the armature when they are circulated by polyphase currents, and auxiliary windings of a material having normal electrical conductivity which deliver a field having $n$ pairs of poles when D.C. currents circulate therein. Such machines may be of the synchronous type, as described in U.S. patent application Ser. No. 443,014, now abandoned. They can also be asynchronous, as described in U.S. Pat. No. 3,742,265 (Smith). The field winding, auxiliary windings and armature windings are located concentrically or coaxially in side by side relation.

In the above constructions, the field winding rotates in operation. As a consequence, sliding seals should be provided on the circuit for feeding the cooling fluid (generally liquid helium) to the cryostat of the field winding and returning it. The design of sliding seals adapted to operate satisfactorily at the cryogenic temperatures is a problem.

On the other hand, British patent specification No. 1,289,092 describes an A.C. generator having a stationary superconducting winding, an armature winding and supplementary coils. In operation, substantial axial forces are exerted on the superconducting field winding and the structure supporting the field winding should be so massive that it constitutes a heat flow path between parts at cryogenic temperatures and parts at ambient temperature which results in losses of such magnitude that a large cryogenic supply is necessary.

SUMMARY OF THE INVENTION

It is an object of the invention to provide a rotary electric machine having a superconducting field winding which is stationary and is not subjected to substantial torque or axially directed forces in operation.

For that purpose, there is provided a synchronous rotary electric machine having, in combination, a stationary frame; a superconducting field winding located in a cryostat enclosure and having an axis and carried by said frame against relative axial movement thereof with respect to said frame, said field winding being constructed to deliver a magnetic field having $n$ pairs of poles, $n$ being an integer, when D.C. currents circulate therein; a mechanical torque transmission shaft rotatable with respect to said frame about said axis; normally conducting polyphase windings for providing a rotary field having $n$ pairs of poles when A.C. currents circulate therein, carried by said shaft and connected to sliding external contacts for exchanging electrical power with an external A.C. circuit; auxiliary windings securely connected to said frame, constructed to deliver a magnetic field having $n$ pairs of poles when D.C. currents circulate therein; and means for adjusting the currents in said auxiliary windings at a value for which the torques and axial forces tending to move said field winding with respect to said frame are lower than a predetermined value.

The polyphase currents which circulate in the armature should be transmitted from an external source (when the machine operates as a motor) or to a load (when the machine operates as a generator) through sliding contacts.

The use of sliding contacts puts a limit on the value of the currents which can be accepted in the armature windings. That limit is of about 10 KA. Technological limitations with respect of the voltage are also to be considered. As a result, the invention is of particular interest in the design of rotary machines whose power does not exceed 25 MW.

Since the field winding, the auxiliary windings and the armature winding are located in side by side relation in the axial direction, the number of pairs of poles may be high. Consequently, the speed may be low and the machine may be used as a motor for ships.

SHORT DESCRIPTION OF THE DRAWINGS

FIG. 2 illustrates the relative arrangement of the windings of the machine of FIG. 1, as seen in the tangential direction.

DETAILED DESCRIPTION OF PREFERRED EMBODIMENTS

Figure 1:
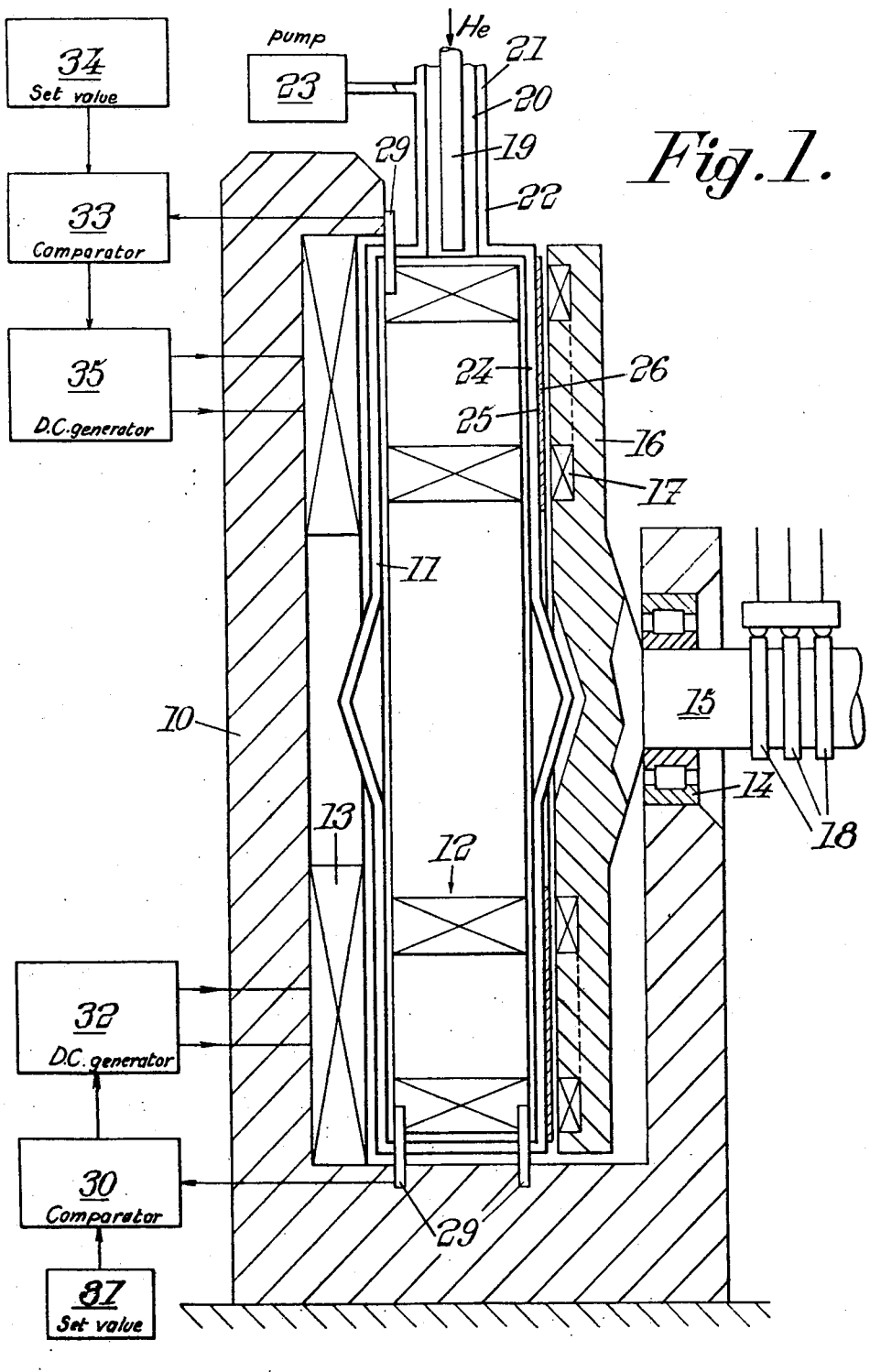
FIG. 1 is a diagrammatic illustration of a motor according to an embodiment of the invention, in vertical cross-section along the axis for making apparent the relative arrangement of the components.

Referring to FIG. 1, there is shown a motor whose main components are located in side by side relation, that is, according to a "flat" geometry. The motor comprises a stationary frame 10 which carries the cryostat 11 which contains the superconducting field winding 12. Auxiliary windings 13 are securely connected to the frame on one side of the field winding. A bearing means 14 is carried by the frame on the other side of the field winding and supports the output shaft 15 of the motor. The shaft has a terminal disk-shaped enlargement 16 formed with slots which receive the electrical conductors which constitute a polyphase winding 17 (three phase winding for instance) adapted to deliver a magnetic field having $n$ pairs of poles. $n$ may easily be 10 or more. The winding 17 will be designated as the armature winding for more simplicity in the following. The stationary frame 10 and the terminal enlargement 16 of the shaft may constitute a magnetic circuit. Then the terminal portion should be of laminated construction. Since however the magnetic flux may be very high due to the use of a superconducting field winding, the magnetic materials are saturated and it may be sufficient for the frame 10 to play the part of a mechanical structure of retaining the field winding 12 and the auxiliary windings 13.

The shaft 15 carries the rotary components of a device for transmission of polyphase currents from an external source. That device, schematically illustrated as sliding rings 18 on FIG. 1, has a structure which is selected to fit the current values to be transmitted. If the current values are very high, liquid contacts (for instance mercury-indium contacts) may be necessary.

In the embodiment of FIG. 1, the field winding 12 and the cryostat 11 are secured against rotation as well as against axial movement and the auxiliary windings are designed for lowering the resultant axial force and torque exerted on the field winding under a predetermined value, which is selected as a function of the mechanical resistance of the structure supporting the field winding 12. With such a design, the cryostat is stationary and the circuit for circulating a cryogenic fluid (generally liquid helium) necessary for maintaining the field winding 12 in superconducting condition may be of relatively simple design. In the embodiment of FIG. 1, a central pipe 19 delivers liquid helium directly into cryostat 11. Pipe 19 is located in a larger pipe 20 for return of helium in vapor phase. Last, pipe 20 is thermally insulated by a space 21 limited by a pipe 22 and in which is a pump 23 maintains a primary vacuum. The evacuated annular space 21 may be connected to the space limited by the internal wall 24 of the cryostat (which may be of conventional construction) and the external wall 25. The surface of the external wall 25 which confronts the armature 17 is preferably provided with a shield 26 of a material having normal electric conductivity for protecting the field winding against the field changes due to the transient phenomenae and to the harmonics of the armature field.

For lowering the heat flow between the field winding 12 at cryogenic temperature and the frame 10 at ambient temperature to a minimum, the field winding 12 is mechanically connected to the frame by a structure having a low mechanical resistance and a low thermal conductivity. As a consequence, the various forces which are exerted on the field winding and tend to move it with respect to the frame should be maintained at a value lower than a predetermined threshold, depending on the mechanical resistance.

In the embodiment of FIG. 1, two types of electromagnetic efforts are applied to the field winding due to the interaction between its field and the armature field, namely a torque tending to rotate the winding about its axis and an axially directed force. For neutralizing the resultant force and torque to a level which is low enough, the auxiliary windings comprise, as indicated on FIG. 2:

first D.C. coils 27 for generating a field having the same number of pairs of poles as that delivered by the field winding; the coils 27 are located for their field to have poles offset by ($\pi/2n$) with respect to the poles of the field winding; the first coils are associated with current supply means which delivers a D.C. current having a value adjusted for the torque on the field winding not to exceed a predetermined value;

second D.C. coils 28 for generating a field having the same number of pairs of poles as the field winding, and having poles facing the poles of the field winding; the second coils are associated with current supply means which delivers a D.C. current having a value adjusted for the axial force on the field winding not to exceed a predetermined value.

The currents in coils 27 and 28 are automatically adjusted by systems which may be of the open-loop or closed-loop type.

Closed loop regulating circuits are used in the embodiment of FIGS. 1 and 2. Appropriate transducers (for instance strain gauges) are carried by the connecting structure, which is illustrated in simplified form as consisting of small diameter rods 29. First transducer means are located on structure 29 and put in circuit for delivering an electric signal which is a direct function of the torque taken by structure 29. That signal is applied to a first input of a comparator 30. The comparator 30 has a second input which receives an adjustable electric signal representing the maximum acceptable value of the torque. That signal is delivered by a manually adjustable set generator 31. The comparator 30 may be of conventional design which delivers a signal of appropriate polarity to a control input of a D.C. generator 32 as long as the signal from the transducer means exceeds the threshold for modifying the current delivered by the D.C. generator until the torque representative signal has been lowered under the threshold set by generator 31. The D.C. generator 32 may be of any conventional design. It may for instance consists of an adjustable self transformer fed by an external A.C. source, a control motor for adjusting the step down ratio of the transformer, and rectifiers. The output current from generator 32 is circulated in the torque neutralizing coils 27 (FIG. 2).

Similarly, transducer means sensing the axial forces is associated with a servo-circuit consisting of a comparator 33, threshold generator 34 and D.C. generator 35.

Alternately, the current adjusting circuits may consist of D.C. generators associated with means for measuring the values of the active current and reactive current which circulate in the armature winding. The D.C. generators adjust the currents in coils 27 and 28 at values which are proportional to the active power and reactive power of the motor, respectively. Such a system is of the open-loop type and relies on prior determination of the proportionality factors for reducing the torque and force on the field winding to a value lower than the threshold.

In a modified embodiment (not shown), the field winding is not secured to the frame directly. It is carried by an annular suport whose angular position about the axis may be adjusted by a mechanical linkage. The auxiliary windings comprise a single set of D.C. coils for torque and axial force neutralization. For compensation to be achieved with a single set of coils, the field winding should be located at an appropriate angle with respect to the auxiliary winding. The electrical angle $\alpha$ between the poles of the coils of the auxiliary windings and the poles of the field winding should be equal to $\phi$ (cos $\phi$ being the power factor of the machine). In other words, the geometrical angle between the poles should be ($\phi/n$). Then, the same current which compensates for the axial forces also compensates for the torque. It is then sufficient to determine the force which tends to move the field winding axially and to adjust the currents in the set of coils for maintaining that force under a predetermined value for correlatively maintaining the torque under another threshold.

Still another possibility consists in leaving the field winding free to move angularly within a limited angular extent while adjusting the current to a value which is appropriate for neutralization of the axial forces. Then, the field winding will automatically move to a position where balance of the forces due to interaction between the various field is achieved. It should be noted that a range of variation of some degrees may be sufficient for a motor having ten pairs of poles or more.

Still another possibility consists of using a symetric coil arrangement. Compensation windings are located on both sides of the field winding and are carried by U-shaped frame. The armature winding also comprises two sets of windings which straddle the auxiliary windings and the field winding. Then, the axial forces are balanced and the coils 28 may be omitted.

The motor should be associated with ancillary components for circulating the field generating current in the field winding, and then short-circuiting the field winding for steady state operation. Such components are conventional and a description thereof may be found in prior art documents, for instance U.S. Pat. application Ser. No. 443,014, now abandoned referred to above.

We claim:

1. A synchronous rotary electric machine having, in combination: a stationary frame; a super-conducting field winding located in a cryostat enclosure, having an axis and carried by said frame against relative movement thereof with respect to said frame along said axis, said field winding being constructed to deliver a magnetic field having $n$ pairs of poles, $n$ being an integer, when DC currents circulate therein; a mechanical torque transmission shaft rotatable with respect to said frame about said axis; a normally conducting polyphase winding for providing a rotating field having $n$ pairs of poles when AC currents circulate therein, said polyphase winding being carried by said shaft, being located in side by side relation with respect to said superconducting field winding, and being connected to sliding external contacts for exchanging electrical power with an external AC circuit; auxiliary DC windings securely connected to said frame in side by side relation with said field winding, said auxiliary DC windings being constructed to deliver a magnetic field having $n$ pairs of poles when DC currents circulate therein; and means for adjusting the currents in said auxiliary windings at a value for which both the torque and axial forces tending to move said field winding with respect to said frame are lower than a predetermined value.

2. Machine according to claim 1, wherein the polyphase windings and the auxiliary winding are located on opposite sides of the field windings.

3. Machine according to claim 1, wherein the field winding is connected to the frame against axial movement and rotational movement about said axis by mechanical means having a low mechanical resistance and a high resistance to heat flow, and wherein the auxiliary winding comprises first windings whose poles confront the poles of the field winding and second windings having poles which are offset by $(\pi/2n)$ with respect to the poles of the field winding, said means for adjusting the current being constructed for circulating a current compensating for the axial forces in the first windings and a current for compensating said torque in said second windings.

4. Machine according to claim 3, wherein said adjusting means comprises transducer means for detecting the axial forces transmitted by said mechanical means, setting means for delivering an electrical signal representative of said predetermined value, and means operatively connected to said transducer and to the setting means for adjusting the current in said first windings.

5. Machine according to claim 3, wherein said adjusting means has transducer means for detecting the torque transmitted by said mechanical means, setting means for delivering a signal representative of the predetermined value and control means operatively connected to said transducer means and to said setting means and adjusting the current circulating in said second windings.

6. Machine according to claim 3, wherein said adjusting means comprises means for measuring the active power and the reactive power transmitted through said sliding contacts.

7. Machine according to claim 1, wherein said auxiliary winding and said polyphase winding each comprise coils symetrically located on both sides of said field winding.

8. Machine according to claim 1, wherein said field winding is mechanically connected to said frame through means adapted to adjust the angular position of said field winding with respect to said compensating winding.

9. Machine according to claim 1, wherein said field winding is mounted on said frame for free rotation with respect to said auxiliary winding in an angular range not exceeding $(n/2\pi)$ and wherein said adjusting means are controlled by means for determining the $\cos \phi$, for the current in said auxiliary winding to be such that compensation of the axial forces is achieved when the field winding takes the angular position for which the torques tending to rotate it are balanced.

* * * * *